United States Patent
Liu et al.

(10) Patent No.: US 12,482,108 B2
(45) Date of Patent: Nov. 25, 2025

(54) SYSTEMS AND METHODS FOR SEGMENTING A MEDICAL IMAGE SEQUENCE

(71) Applicant: Shanghai United Imaging Intelligence Co., Ltd., Shanghai (CN)

(72) Inventors: Yikang Liu, Cambridge, MA (US);
Zhang Chen, Brookline, MA (US);
Xiao Chen, Lexington, MA (US);
Shanhui Sun, Lexington, MA (US);
Terrence Chen, Lexington, MA (US)

(73) Assignee: Shanghai United Imaging Intelligence Co., Ltd., Shanghai (CN)

( * ) Notice: Subject to any disclaimer, the term of this patent is extended or adjusted under 35 U.S.C. 154(b) by 310 days.

(21) Appl. No.: 18/209,704

(22) Filed: Jun. 14, 2023

(65) Prior Publication Data
US 2024/0420334 A1 Dec. 19, 2024

(51) Int. Cl.
*G06T 7/11* (2017.01)

(52) U.S. Cl.
CPC ...... *G06T 7/11* (2017.01); *G06T 2207/10016* (2013.01); *G06T 2207/10121* (2013.01); *G06T 2207/20081* (2013.01); *G06T 2207/20084* (2013.01); *G06T 2207/30101* (2013.01)

(58) Field of Classification Search
CPC ............. G06T 7/11; G06T 2207/10016; G06T 2207/10121; G06T 2207/20081; G06T 2207/20084; G06T 2207/30101
See application file for complete search history.

(56) References Cited

U.S. PATENT DOCUMENTS

| | | | |
|---|---|---|---|
| 9,095,308 B2 | 8/2015 | Florent et al. | |
| 10,176,388 B1 | 1/2019 | Ghafarianzadeh et al. | |
| 10,402,986 B2 | 9/2019 | Ray et al. | |
| 11,587,236 B2 * | 2/2023 | Palma | G16H 30/40 |
| 2010/0217116 A1 * | 8/2010 | Eck | A61B 6/463 378/4 |
| 2020/0410689 A1 | 12/2020 | Xu et al. | |
| 2022/0114727 A1 * | 4/2022 | Laaksonen | G06T 7/0012 |

FOREIGN PATENT DOCUMENTS

| | | |
|---|---|---|
| CN | 102567734 B | 7/2012 |
| CN | 106331433 B | 1/2017 |

* cited by examiner

*Primary Examiner* — Daniel G Mariam
(74) *Attorney, Agent, or Firm* — Zhong Law, LLC

(57) ABSTRACT

An apparatus may obtain a sequence of medical images of a target structure and determine, using a first ANN, a first segmentation and a second segmentation of the target structure based on a first medical image and a second medical image, respectively. The first segmentation may indicate a first plurality of pixels that may belong to the target structure. The second segmentation may indicate a second plurality of pixels that may belong to the target structure. The apparatus may identify, using a second ANN, a first subset of true positive pixels among the first plurality of pixels that may belong to the target structure, and a second subset of true positive pixels among the second plurality of pixels that may belong to the target structure. The apparatus may determine a first refined segmentation and a second refined segmentation of the target structure based on the true positive pixels.

18 Claims, 7 Drawing Sheets

SYSTEMS AND METHODS FOR SEGMENTING A MEDICAL IMAGE SEQUENCE

BACKGROUND

Semantic object segmentation is a fundamental task in medical image analyses, such as those involving X-ray fluoroscopy, magnetic resonance imaging (MRI), computed tomography (CT), etc. In recent years, deep learning (DL) based techniques have been increasingly employed for automatic medical image segmentation, but doing so for a medical image sequence (e.g., a medical image video) such as one containing fast-moving and overlapping objects (e.g., blood vessels, ribs, surgical guide wires, catheters, etc.) remains challenging.

SUMMARY

Described herein are systems, methods, and instrumentalities associated with medical image segmentation. An apparatus as described herein may obtain a sequence of medical scan images (e.g., x-ray fluoroscopy images) associated with a target structure (e.g., a blood vessel, a catheter, a guide wire, etc.), wherein the sequence of medical scan images may include a first medical scan image and a second medical scan image. The apparatus may determine, using a first artificial neural network (ANN), a first segmentation of the target structure based on the first medical scan image and a second segmentation of the target structure based on the second medical scan image, wherein the first segmentation may indicate a first plurality of pixels of the first medical scan image that may belong to the target structure, and wherein the second segmentation may indicate a second plurality of pixels of the second medical scan image that may belong to the target structure. The apparatus may further identify, using a second ANN, a first subset of true positive pixels among the first plurality of pixels that may belong to the target structure, and a second subset of true positive pixels among the second plurality of pixels that may belong to the target structure. Based on the first subset of true positive pixels and the second subset of true positive pixels, the apparatus may determine a first refined segmentation of the target structure and a second refined segmentation of the target structure, respectively.

In examples, determining the first subset of true positive pixels and the second subset of true positive pixels using the second ANN may include determining, using the second ANN, respective features associated with the first subset of true positive pixels and the second subset of true positive pixels based on the first medical scan image and the second medical scan image, respectively; and identifying the first subset of true positive pixels and the second subset of true positive pixels based on a determination that the respective features associated with the first subset of true positive pixels and the second subset of true positive pixels are substantially similar.

In examples, the apparatus described herein may also identify, using the second ANN, a first subset of false positive pixels and a second subset of false positive pixels from the first plurality of pixels and the second plurality of pixels, respectively, wherein the first subset of false positive pixels may include pixels from the first medical scan image that have been falsely indicated as belonging to the target structure, and the second subset of false positive pixels may include pixels from the second medical scan image that have been falsely indicated as belonging to the target structure.

In examples, determining the first subset of false positive pixels and the second subset of false positive pixels using the second ANN may include determining, using the second ANN, respective features associated with the first subset of false positive pixels and the second subset of false positive pixels based on the first medical scan image and the second medical scan image, respectively, and identifying the first subset of false positive pixels and the second subset of false positive pixels based at least on a determination that the respective features associated with the first subset of true positive pixels and the first subset of false positive pixels may be substantially different, or a determination that the respective features associated with the first subset of true positive pixels and the second subset of false positive pixels may be substantially different.

In examples, the second ANN may be trained using a contrastive learning technique to minimize a difference between the respective features associated with the first subset of true positive pixels and the second subset of true positive pixels, and to maximize at least one of a difference between the respective features associated with the first subset of true positive pixels and the first subset of false positive pixels, or a difference between the respective features associated with the first subset of true positive pixels and the second subset of false positive pixels.

In examples, determining the first subset of true positive pixels and the second subset of true positive pixels using the second ANN may include extracting, using the second ANN, one or more features from the first medical scan image that may be associated with a false positive pixel of the first medical scan image, extracting, using the second ANN, one or more features from the second medical scan image that may be associated with a pixel of the second medical scan image, and determining whether the pixel of the second medical scan image may belong to the target structure based on a weighted sum of features calculated from the one or more features extracted from the first medical scan image and the one or more features extracted from the second medical scan image.

In examples, the second ANN described herein may be characterized by a recurrent structure (e.g., comprising one or more encoder modules and one or more decoder modules) via which a first set of features extracted by the second ANN from the first medical scan image may be used as an input to determine a second set of features associated with the second medical scan image. In examples, the second ANN may be trained using at least a first training image and a second training image, and, during the training of the second ANN, features extracted from the first training image may be used to determine features associated with the second training image and treated as constants during backpropagation.

BRIEF DESCRIPTION OF THE DRAWINGS

A more detailed understanding of the examples disclosed herein may be had from the following description, given by way of example in conjunction with the accompanying drawing.

DETAILED DESCRIPTION

The present disclosure is illustrated by way of example, and not by way of limitation, in the figures of the accompanying drawings. A detailed description of illustrative embodiments will be described with reference to these figures. Although the description may provide detailed examples of implementations, it should be noted that the details are intended to be illustrative and in no way limit the scope of the application. It should also be noted that, while the examples may be described in the context of a medical environment, those skilled in the art will appreciate that the techniques disclosed therein may also be applied to other environments or use cases.

Figure 1:
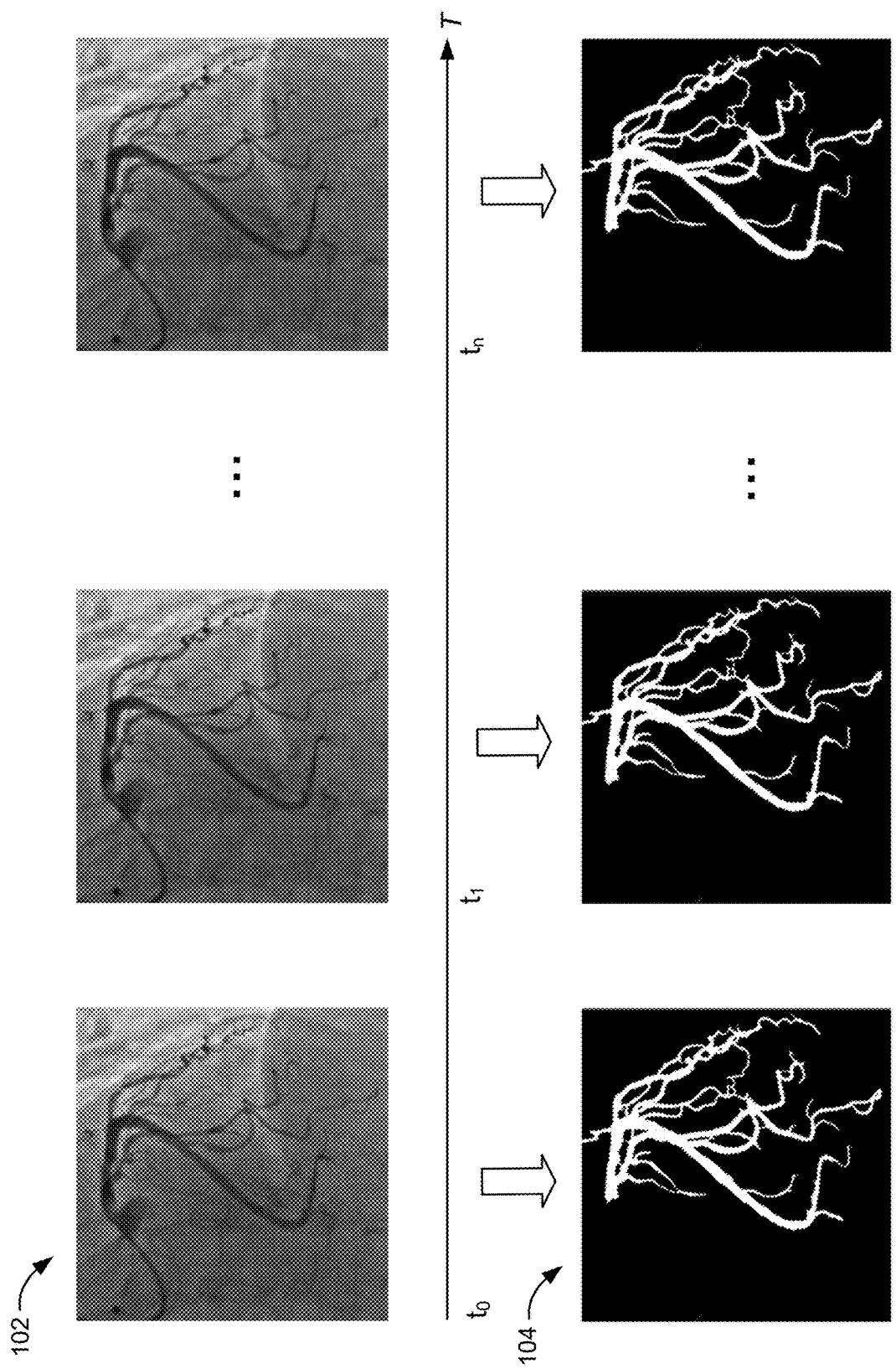
FIG. 1 is a simplified diagram illustrating an example of medical image segmentation.

FIG. 1 is a diagram illustrating an example of medical image segmentation. As shown in the figure, an apparatus (e.g., one or more computing devices) configured to perform the image segmentation task may be configured to obtain a medical image sequence 102 (e.g., a medical image video) that may include multiple medical scan images (e.g., at least a first medical scan image and a second medical scan image) of a target structure along a time axis T (e.g., at times $t_0$, $t_1$, $t_2$, etc.). The medical image sequence may be obtained from a medical imaging device (e.g., an X-ray machine, an MRI scanner, or a CT scanner) or from a patient records database configured to store medical scan images of patients. The target structure captured in the medical image sequence 102 may include an anatomical structure of a human body, such as a blood vessel, a bone (e.g., a rib), an organ, a tissue, etc., that may be the target of a medical investigation. The target structure may also be a medical device inserted into the human body, such as a catheter, a stent, or a guide wire, the state of which may need to be determined or monitored.

In response to obtaining the medical image sequence 102, the apparatus configured to perform the image segmentation task (e.g., referred to herein as an image segmentation apparatus) may identify an area in each of the medical scan images that may correspond (e.g., belong) to the target structure, and generate a respective segmentation 104 based on each medical scan image to indicate the area of the medical scan image that may correspond to the target structure. In some examples (e.g., if the medical image sequence 102 includes two-dimensional (2D) scan images), such an identified area may include a plurality of pixels, while in other example (e.g., if the medical image sequence 102 includes three-dimensional (3D) scan images), the identified area may include a plurality of voxels. In either scenario, segmentations 104 may, as examples, include segmentation masks or segmentation heatmaps comprising predicted values (e.g., corresponding to each pixel or voxel in images 102) that may indicate which pixels or voxels of images 102 may belong to the target structure. The predicted values may include Boolean values that may indicate whether the corresponding pixels or voxels belong to the target structure. The predicted values may also include numerical values (e.g., in the range of 0 to 1) that may indicate the respective probabilities of the corresponding pixels or voxels being a part of the target structure. The segmentation apparatus may generate graphical representations of the segmentations 104 (e.g., by color-coding the segmentation masks in black and white, as shown in FIG. 1) to indicate which pixels or voxels of the medical images 102 may belong to the target structure (e.g., white-colored pixels may belong to the target structure, while black-colored pixels may belong to the image background or to another structure captured in the images). For ease of description, the examples provided herein may be described with reference to one or more pixels of a 2D medical scan image, but those skilled in the art will appreciate that the examples may also be applicable to voxels of a 3D medical scan image.

Figure 2:
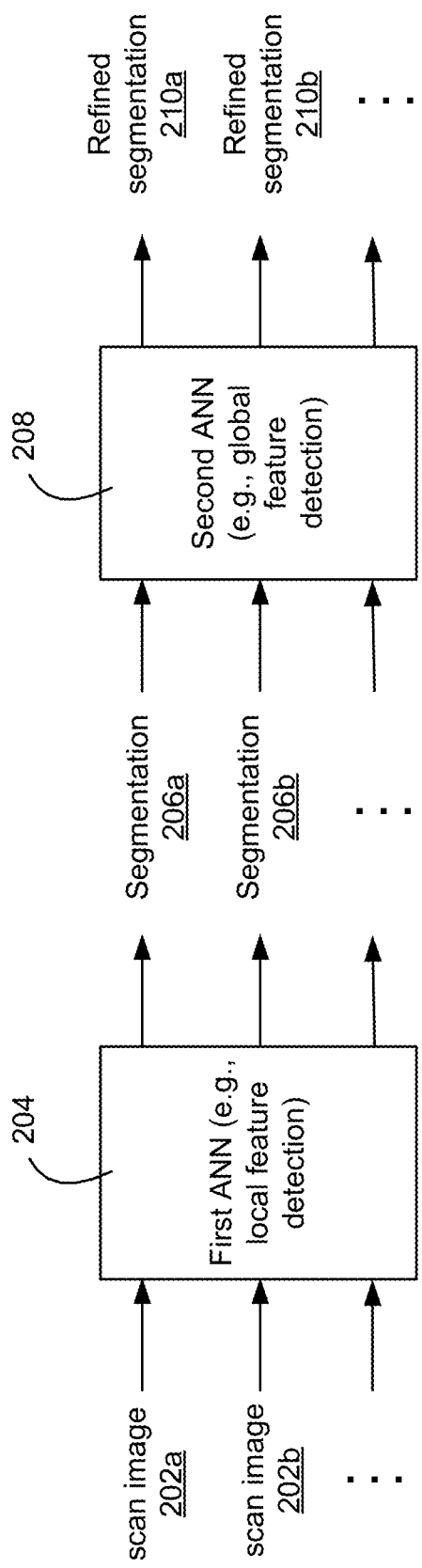
FIG. 2 is a simplified diagram illustrating example techniques for segmenting a target structure from a medical image sequence.

FIG. 2 illustrates example techniques for segmenting a target structure (e.g., one or more blood vessels, ribs, surgical guide wires, catheters, etc.) from a medical image sequence (e.g., an X-ray fluoroscopy video). As described herein, the medical image sequence may include a plurality of medical scan images such as a first scan image 202a, a second scan image 202b, etc. that may depict the target structure over a time interval. To automatically segment the target structure from the sequence, a machine-learning (ML) based system or apparatus may be designed to explore the features of each individual scan image (e.g., in each of image 202a, 202b, etc.) as well as the spatiotemporal characteristics of the image sequence as a whole (e.g., stable and/or changing features from one image to the next). The former may be referred to herein as local features, the latter may be referred to herein as global features, and the design of the segmentation system or apparatus may maintain low computational complexity and/or memory allocation, while still allow for exploration of both the local and global features.

In examples, the image segmentation system or apparatus described herein may be configured to determine respective segmentations (e.g., 206a, 206b, etc.) of the target structure based on input scan images 202a, 202b, etc. using a first artificial neural network (ANN) 204 that may be trained with a bias towards (e.g., a focus on) the local features of each input scan image, such as, e.g., pixel intensities, textures, corners, edges, etc. of each input scan image. The first ANN 204 may include, for example, a convolutional neural network (CNN) comprising one or more convolutional layers, one or more pooling layers, and/or one or more fully connected layers. Each of the convolutional layers may include a plurality of convolution kernels or filters configured to extract specific features from each input scan image. The convolution operations may be followed by batch normalization and/or line or non-linear activation, and the features extracted by the convolutional layers may be down-sampled through the pooling layers and/or the fully connected layers to obtain a feature map or feature vector that may represent the extracted features. In examples, the CNN may further include one or more un-pooling layers and one or more transposed convolutional layers. Through the un-pooling layers, the down-sampled features extracted from each input scan image may be up-sampled and the up-sampled features may be further processed through the transposed convolutional layers to derive a denser feature representation (e.g., a higher-resolution feature map, a higher-dimension feature vector, etc.). The denser feature representation may then be used to predict whether a pixel of the input scan image is a part of the target structure depicted in the scan image. As will be described in greater detail below, the parameters of the first ANN 204 (e.g., weights associated with various layers of the ANN) may be learned via a training process, during which the prediction made by the ANN may be compared to a corresponding ground truth to determine a loss associated with the prediction, and the parameters of the ANN may then be adjusted with an objective to minimize the loss (e.g., by back-propagating a gradient descent of the loss through the ANN).

Since the first ANN 204 may be trained to focus on local features while determining the segmentations 206a, 206b, etc., the pixels predicted by the ANN as belonging to the target structure in each corresponding input scan image 202a, 202b, etc. may include a subset of pixels or voxels that truly belong to the target structure, and a subset of pixels that may be falsely predicted as belonging to the target structure. The former may be referred to herein as true positive pixels, the latter may be referred to herein as false positive pixels, and the image segmentation system or apparatus described herein may be further configured to refine the segmentations 206a, 206b, etc. by eliminating the false positive pixels from each segmentation 206a, 206b, etc. In examples, the image segmentation system or apparatus may be configured to obtain the refined segmentations (e.g., 210a, 210b, etc.) using a second ANN 208 that may be trained with a bias toward (e.g., a focus on) global features of the input image sequence as a whole. Since these global features may indicate the spatial and/or temporal correspondence of pixels from one scan image to the next, they may provide additional information that may be used by the image segmentation system or apparatus to correct faulty predictions that may result from focusing only on the local features of each input image. For example, let S denote the plurality of pixels predicted as belonging to the target structure in each scan image 202a, 202b, etc. by the first ANN 204. Then S may include a subset P of true positive pixels and a subset N of false positive signals, and the second ANN 208 may be trained to distinguish the true positive pixels from the false positive pixels so as to derive a refined segmentation (e.g., 210a, 210b, etc. corresponding to each input scan image) in which only the true positive pixels are indicated as belonging to the target structure.

In examples, the second ANN 208 may be trained using contrastive learning techniques via which the second ANN 208 may acquire the ability to generate feature representations for the plurality of pixels in set S in manners that may make the features associated with the true positive pixels (e.g., in set P) close to each other, and the respective features associated with the true positive pixels (e.g., in set P) and the false positive pixels (e.g., in set N) far from each other. In examples, the second ANN 208 may include one or more hierarchical and/or recurrent modules that may allow the correspondence between spatially and/or temporally distant pixels (e.g., from different images or different areas of the same image) to be modeled with low computational complexity and/or low memory allocation. Each of the modules may include a CNN (e.g., as described above) and/or a transformer with an attention mechanism (e.g., as will be described in greater detail below). The hierarchical structure may be used to process images of different scales or resolutions, while the recurrent structure may be used to accomplish sequence modeling.

Figure 3:
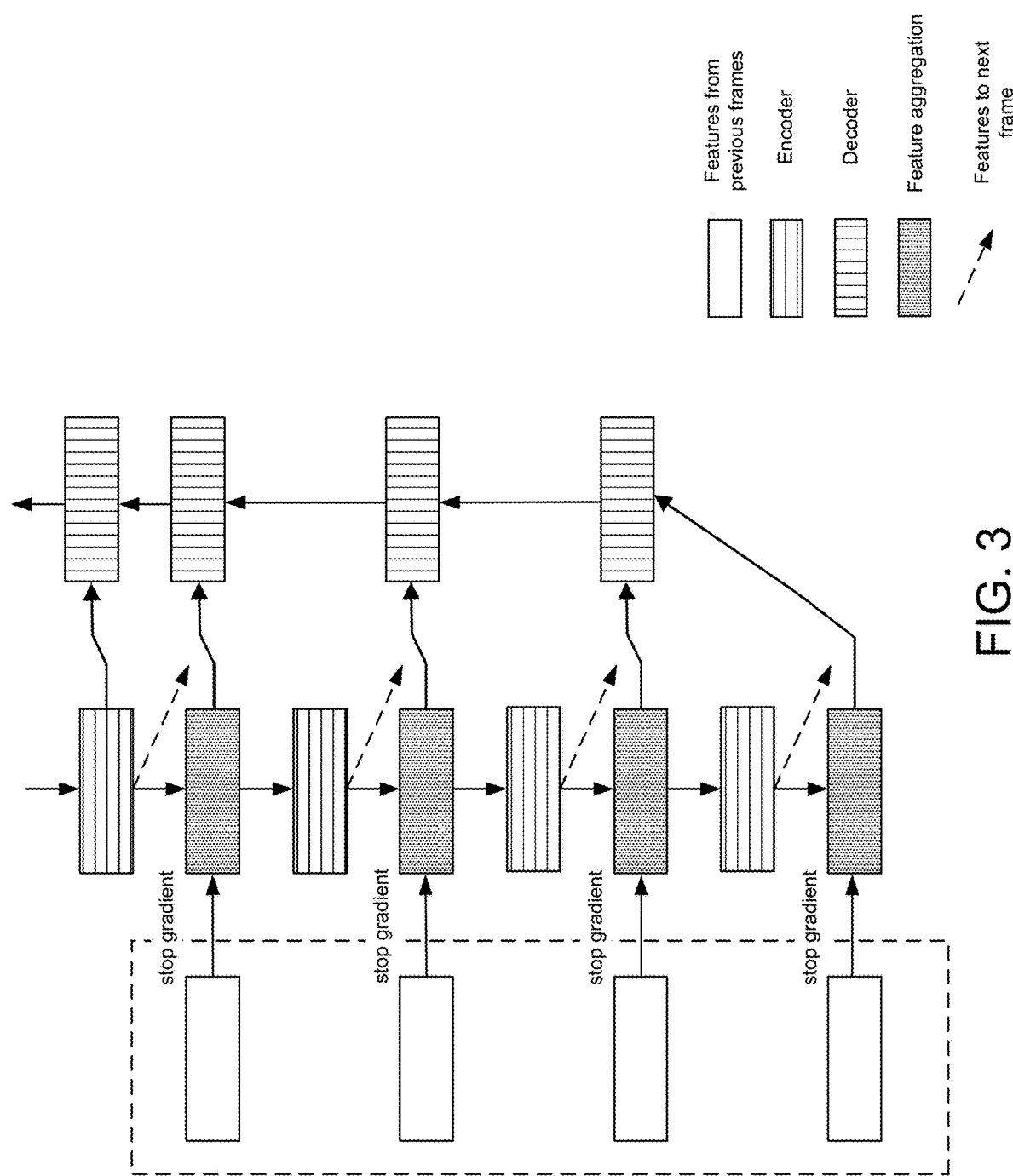
FIG. 3 is a simplified diagram illustrating an example architecture that may be employed by an ANN described herein.

FIG. 3 illustrates an example architecture that may be employed by the second ANN 208. As shown, the second ANN 208 may include one or more hierarchical and/or recurrent modules each having an encoder-decoder structure. The encoder of each module may be configured to extract and encode features from an input (e.g., an original scan image or an intermediate segmentation generated by a previous module), and output a representation of the features (e.g., via a feature tensor) to the decoder of the module. The feature representation may have a lower resolution and/or more channels than the input (e.g., the feature representation may capture higher-level semantic information regarding the input), and the decoder may be configured to generate a desired output, such as a prediction about whether a pixel belongs to a target structure, based on the feature representation provided by the encoder. In examples, the second ANN may further include an aggregation module or function (e.g., corresponding to each encoder) that may be configured to aggregate, during the feature encoding process, features from multiple images (e.g., a current image and one or more previous images) and provide the aggregated features for decoding. In examples, the features extracted by the encoder for a current frame may be fed to the encoder for a next frame (e.g., as indicated by the dotted arrows in FIG. 3). Using such a recurrent structure, information obtained from earlier images of the input sequence may be factored into a prediction made for a later image of the sequence, allowing that prediction to reflect global characteristics of the image sequence.

In examples, during training of the second ANN, features extracted from one or more earlier images of an image sequence may be used to determine the features of a current image (e.g., in a forward direction), but those previous features may be treated as constants (e.g., the derivatives of the features with respect to the parameters of the second ANN may be zero) during backpropagation, for example, to prevent gradient explosion, conserve memory and/or reduce the computation complexity of the training. The exclusion of the previous features from the backpropagation may be controllable via a configuration parameters, such as, e.g., the "stop gradient" parameter shown in FIG. 3.

Figure 4:
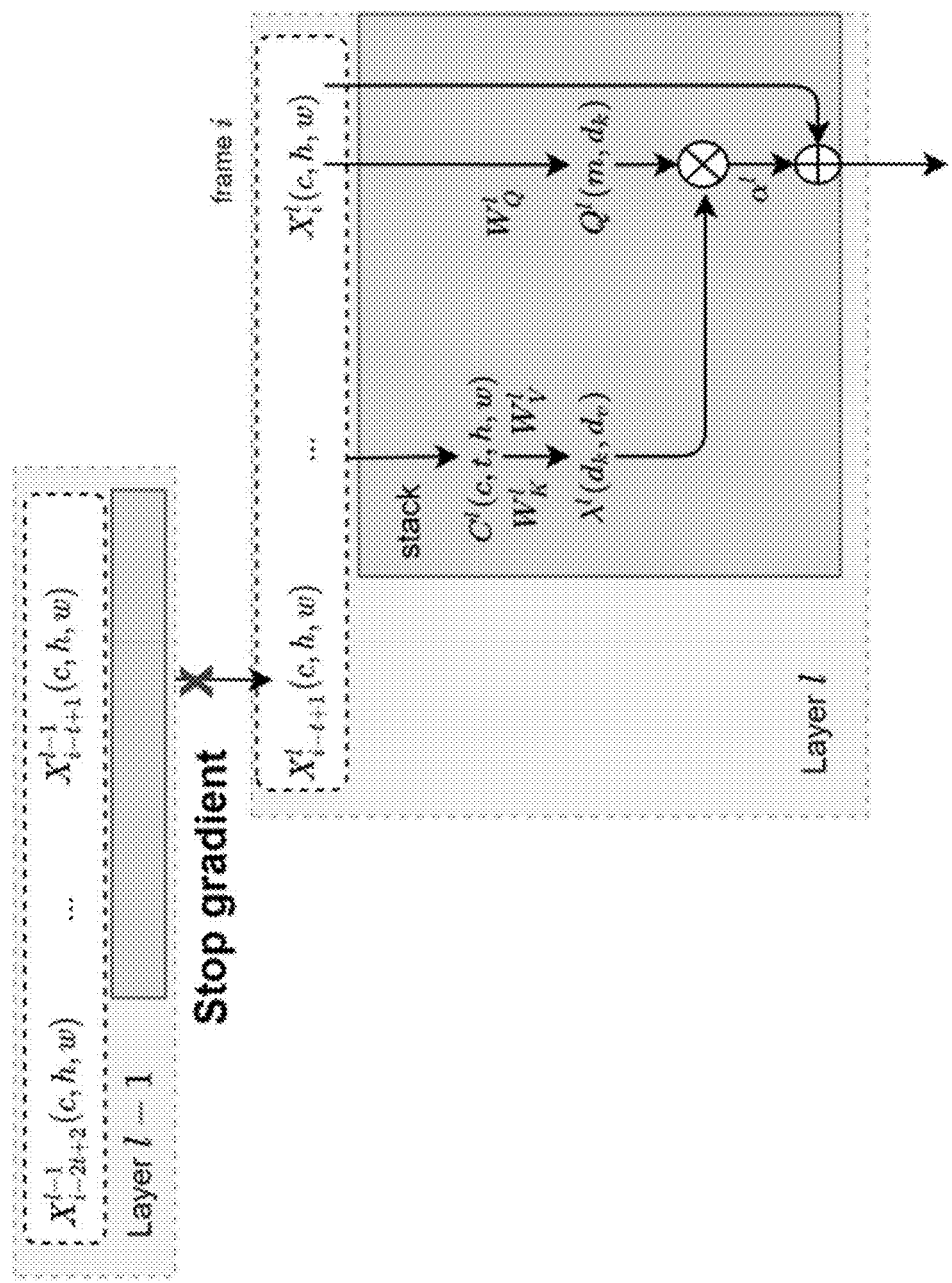
FIG. 4 is a simplified diagram illustrating an example of an attention mechanism.

In examples, the aggregation module or function described herein may utilize a fast attention mechanism to process the features from previous image frames that may be more relevant to a prediction about a current image frame. FIG. 4 illustrates an example of such an attention mechanism. As shown in FIG. 4, $X_{i-t+1}, \ldots, X_{i-1}$ may represent features from previous image frames and $X_i$ may represent features from a current image frame. These features may be stacked into a tensor $C \in R^{c \times t \times h \times w}$ representing the video context, where c, t, h, w may represent a channel number, a frame number, a height, and a width, respectively. In examples, tensor C may be reshaped into a 2D tensor ($R^{c \times n}$, n=t×h×w) and linearly projected into key (K) and value (V) tensors, for example, by multiplying tensor C with learnable parameters $W_K$ and $W^V$, respectively. These tensors may be further transformed into a lambda tensor $\lambda = \overline{K}^T V + E^T V$, where $\overline{K}$ may correspond to K normalized across pixels via a softmax operation and E may represent position embeddings. As such, the interaction between video context C and features $X_i$ of a frame may be modeled, for example, by projecting $X_i$ to a tensor Q with learnable parameters $W_Q$ and multiplying the projected features with $\lambda$. The result may then be multiplied with a learnable parameter a and added to $X_i$.

In examples, the second ANN may further employ a gated mechanism with which features associated with one or more false positive pixels (e.g., pixels of subset N described herein) in a first image may be carried into a second image and combined with the features extracted for one or more pixels (e.g., pixels of set S described herein) from the second image, before the combined features (e.g., as a weighted sum) are used for making a prediction. Such a design may be based on an observation that, with at least medical image sequences (e.g., coronary X-ray fluoroscopy videos), an object (e.g., a rib) falsely predicted as the target structure (e.g., coronary blood vessels) may stay in the field of view and have a similar appearance across multiple images. The prediction about such an object also tends to be correct if it is located far away from the target structure. As such, the accuracy of a segmentation task as described herein may be improved by considering the correspondence of multiple images with respect to such an object. For instance, denoting one or more features associated with a false positive pixel from subset N of image t as $F^{(t)}$, $F^{(t)}$ may be propagated to another image t' and combined with the respective features of one or more pixels (e.g., every pixel) of set S in image t' to derive combined features for each of those pixels. For example, for the j-th pixel in frame t', let $F_j^{(t')}$ represent the feature(s) associated with that pixel in image t'. The combined features for the j-th pixel may be derived as a weighted sum of the features $F^{(t)}$ extracted for a false positive pixel from image t (e.g., the false positive pixel located closest to the j-th pixel) and the features $F_j^{(t')}$ extracted for the j-th pixel from image t'. The weighted sum may be calculated, for example, based on equation 1 below, and the combined features derived from the calculation may be used to determine whether the j-th pixel belongs to the target structure.

$$(1-w)F_j^{(t')} + wF^{(t)}, \; w = \frac{e^{-F_j^{(t')}F^{(t)}}}{\sum_j e^{-F_j^{(t')}F^{(t)}}} \qquad 1)$$

Figure 5:
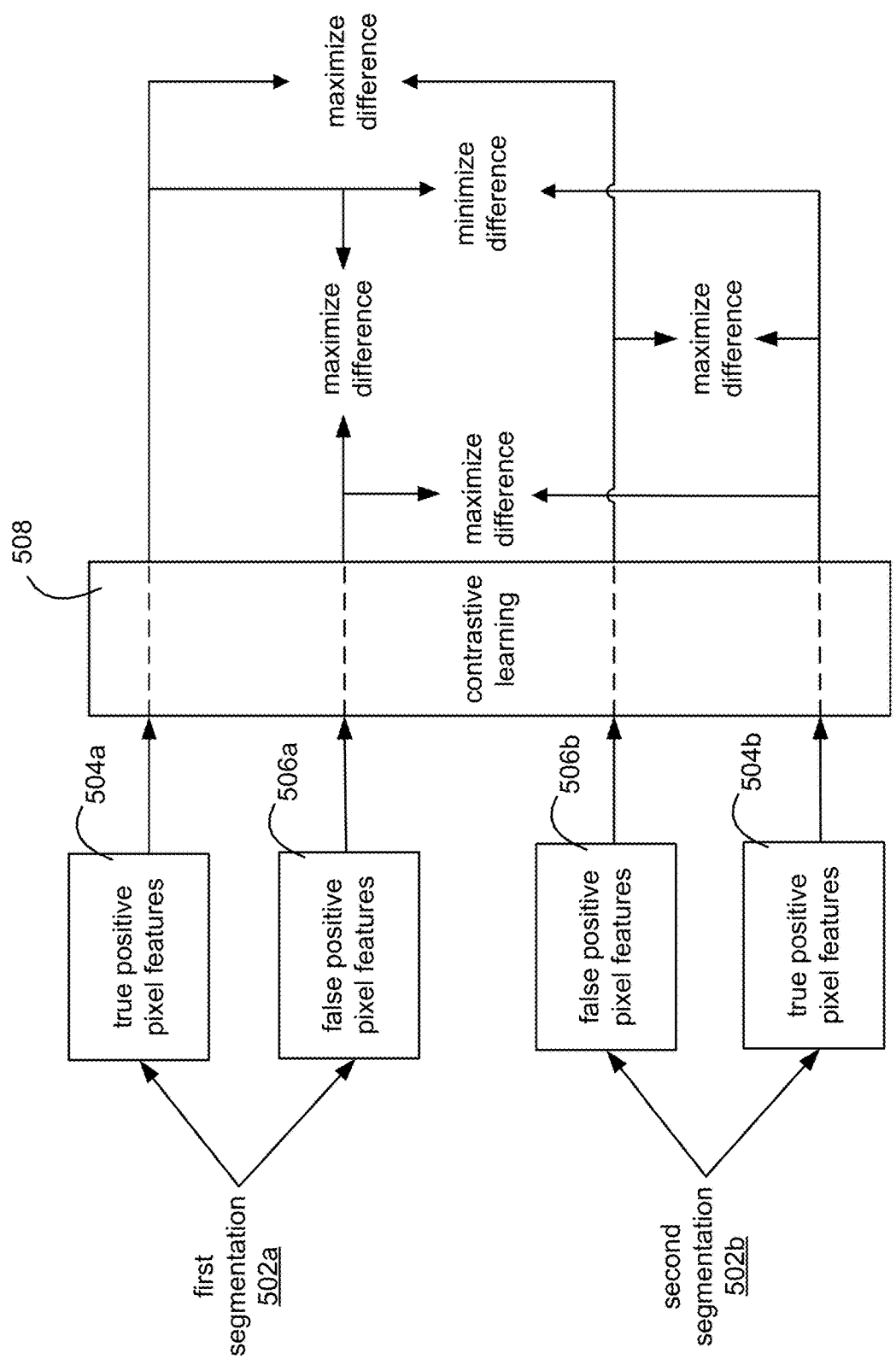
FIG. 5 is a simplified diagram illustrating an example technique for training a neural network to refine segmentations of a target structure.

FIG. 5 illustrates an example technique for training a neural network (e.g., the second ANN 208 of FIG. 2) to refine segmentations of a target structure that may be generated primarily based on local features of a medical image sequence (e.g., using the first ANN 204 of FIG. 2). As shown, the training may be conducted using a dataset that may include a first training segmentation 502a (e.g., a first segmentation mask associated with a first medical scan image) and a second training segmentation 502b (e.g., a second segmentation mask associated with a second medical scan image). As described herein, each of the training segmentations 502a and 502b may indicate a respective plurality of pixels that may belong to the target structure, and the plurality of pixels may include a subset of true positive pixels with positive ground truth labels (e.g., these pixels may truly belong to the target structure) and a subset of false positive pixels with negative ground truth labels (e.g., these pixels may be falsely identified as belonging to the target structure). To distinguish the true positive pixels from the false positive pixels (e.g., so as to refine the input segmentations 502a and 502b), the neural network (e.g., the second ANN 208 of FIG. 2) may be trained to predict, from the input segmentations 502a and 502b, respective features that may be associated with the true positive pixels (e.g., features 504a and 504b shown in FIG. 5) and respective features that may be associated with the false positive pixels (e.g., features 506a and 506b shown in FIG. 5). The feature prediction may be guided by a contrastive loss function (e.g., contrastive learning 508) designed to ensure that the respective features predicted by the neural network for two true positive pixels are substantially consistent (e.g., to minimize a difference between those features), and that the features predicted by the neural network for a false positive pixel are substantially different from the features predicted by the neural network for a true positive pixel (e.g., to maximize a difference between those features). The pixels that are compared during the contrastive learning may be from the same image frame (e.g., a frame associated with first segmentation 502a or second segmentation 502b) or from different image frames (e.g., frames associated with first segmentation 502a and second segmentation 502b, respectively).

Various loss functions may be used to facilitate the contrastive learning 508. For example, the loss function may be a distance-based loss function designed to reduce a Euclidean distance between the features predicted for two true positive pixels, and to enlarge a Euclidean distance between the respective features predicted for a true positive pixel and a false positive pixel. As another example, the loss function may be designed based on a cosine similarity of the features (e.g., increasing the similarity of features may be similar to decreasing a distance between the features). Once trained to predict the features in such manners and given multiple input segmentations (e.g., segmentations 206a, 206b, etc.), the neural network (e.g., the second ANN 208) may be used to extract features from the input segmentations and identify true positive pixels in those input segmentations based on a determination that the features associated with those pixels are substantially similar to each other (e.g., within the same input segmentation or across the multiple input segmentations). The neural network may also be used to identify false positive pixels in those input segmentations based on a determination that the features associated with those pixels are substantially different from the features associated with the true positive pixels (e.g., in the same input segmentation or across the multiple input segmentations).

Figure 6:
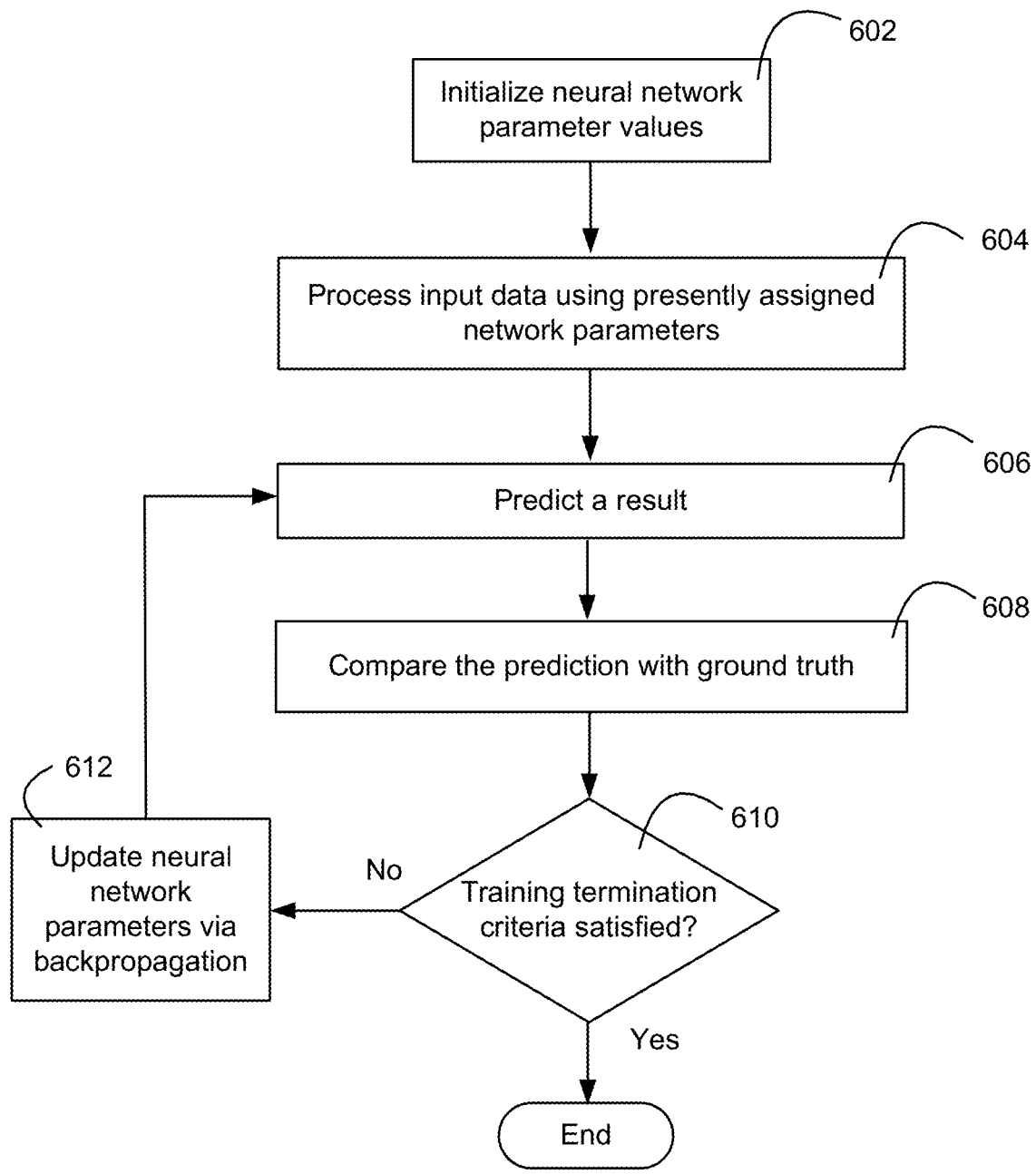
FIG. 6 is a simplified flow diagram illustrating an example process for training a neural network to perform one or more of the tasks described herein.

FIG. 6 illustrates example operations that may be associated with training a neural network (e.g., an ML model implemented by the neural network) for performing one or more of the tasks described herein. As shown, the operations may include initializing the operating parameters of the neural network (e.g., weights associated with various layers of the neural network) at 602, for example, by sampling from a probability distribution or by copying the parameters of another neural network having a similar structure. The operations may further include processing an input (e.g., medical scan image 202a or 202b of FIG. 2, or segmentation 206a or 206b of FIG. 2) using presently assigned parameters of the neural network at 604, and making a prediction for a desired result (e.g., a preliminary segmentation mask or a refine segmentation) at 606. The prediction result may be compared to a ground truth at 608 to determine a loss associated with the prediction, for example, based on a loss function. Such a loss function may be based on a mean squared error (MSE) between the prediction result and the ground truth (e.g., for the training of the first ANN 204 shown in FIG. 2), or based on a contrast loss function (e.g., for the training of the second ANN 208 shown in FIG. 2). Subsequently, the loss determined using the loss function may be used to determine, at 610, whether one or more training termination criteria are satisfied. For example, the training termination criteria may be determined to be satisfied if the loss is below a threshold value or if the change in the loss between two training iterations falls below a threshold value. If the determination at 610 is that the termination criteria are satisfied, the training may end; otherwise, the presently assigned network parameters may be adjusted at 612, for example, by backpropagating (e.g., if stop-gradient is not applied) a gradient descent such as a stochastic gradient descent of the loss function through the network before the training returns to 606.

For simplicity of explanation, the operations of the methods are depicted and described herein with a specific order. It should be appreciated, however, that these operations may occur in various orders, concurrently, and/or with other operations not presented or described herein. Furthermore, it should be noted that not all operations that the apparatus is capable of performing are depicted in the drawings or described herein. It should also be noted that not all illustrated operations may be required to be performed.

Figure 7:
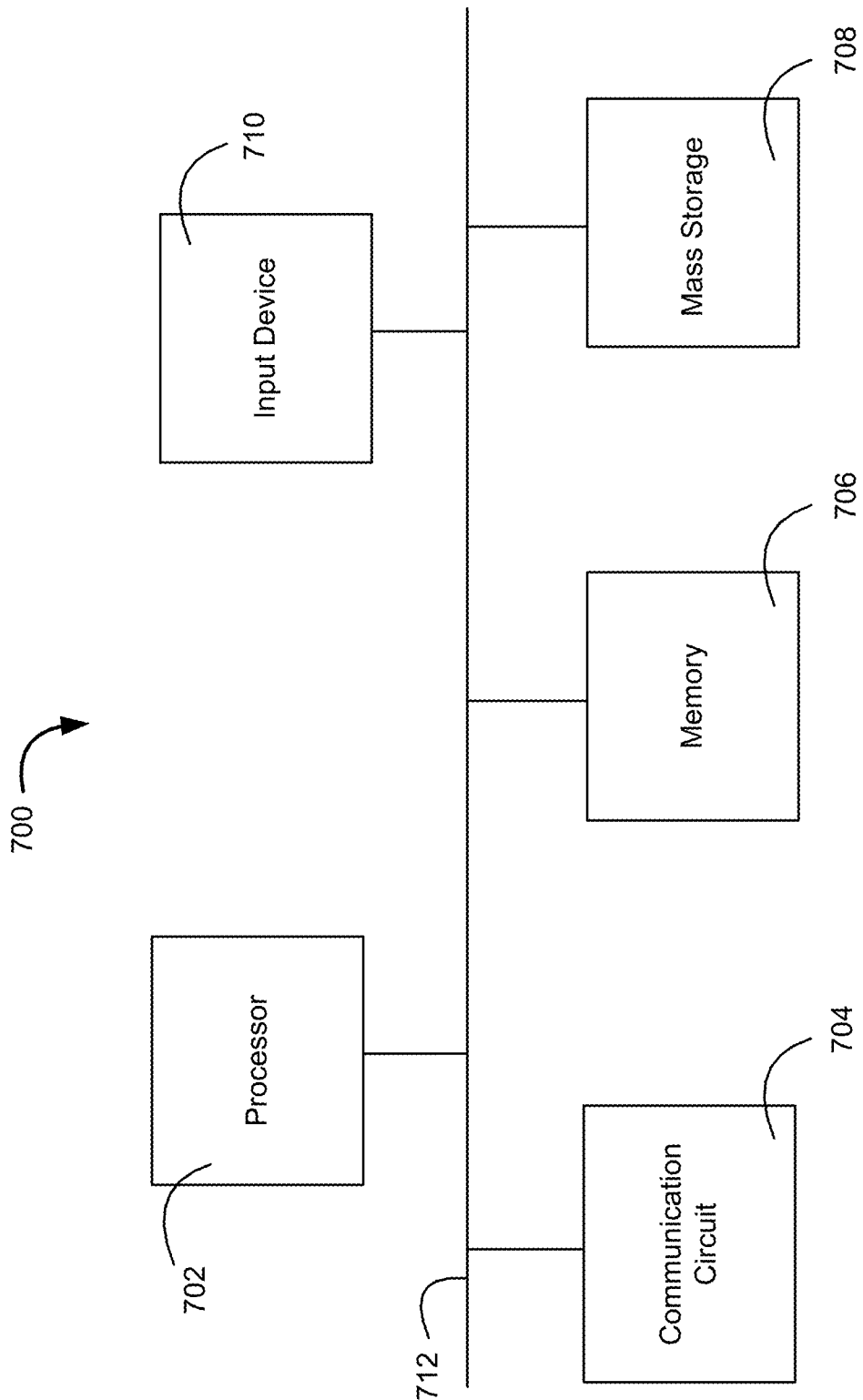
FIG. 7 is a block diagram illustrating example components of an apparatus that may be configured to perform one or more of the tasks described herein.

The systems, methods, and/or instrumentalities described herein may be implemented using one or more processors, one or more storage devices, and/or other suitable accessory devices such as display devices, communication devices, input/output devices, etc. FIG. 7 is a block diagram illustrating an example apparatus 700 that may be configured to perform the tasks described herein. As shown, apparatus 700 may include a processor (e.g., one or more processors) 702, which may be a central processing unit (CPU), a graphics processing unit (GPU), a microcontroller, a reduced instruction set computer (RISC) processor, application specific integrated circuits (ASICs), an application-specific instruction-set processor (ASIP), a physics processing unit (PPU), a digital signal processor (DSP), a field programmable gate array (FPGA), or any other circuit or processor capable of executing the functions described herein. Apparatus 700 may further include a communication circuit 704, a memory 706, a mass storage device 708, an input device 710, and/or a communication link 712 (e.g., a communication bus) over which the one or more components shown in the figure may exchange information.

Communication circuit 704 may be configured to transmit and receive information utilizing one or more communication protocols (e.g., TCP/IP) and one or more communication networks including a local area network (LAN), a wide area network (WAN), the Internet, a wireless data network (e.g., a Wi-Fi, 3G, 4G/LTE, or 5G network). Memory 706 may include a storage medium (e.g., a non-transitory storage medium) configured to store machine-readable instructions that, when executed, cause processor 702 to perform one or more of the functions described herein. Examples of the machine-readable medium may include volatile or non-volatile memory including but not limited to semiconductor memory (e.g., electrically programmable read-only memory (EPROM), electrically erasable programmable read-only memory (EEPROM)), flash memory, and/or the like. Mass storage device 708 may include one or more magnetic disks such as one or more internal hard disks, one or more removable disks, one or more magneto-optical disks, one or more CD-ROM or DVD-ROM disks, etc., on which instructions and/or data may be stored to facilitate the operation of processor 702. Input device 710 may include a keyboard, a mouse, a voice-controlled input device, a touch sensitive input device (e.g., a touch screen), and/or the like for receiving user inputs to apparatus 700.

It should be noted that apparatus 700 may operate as a standalone device or may be connected (e.g., networked, or clustered) with other computation devices to perform the functions described herein. And even though only one instance of each component is shown in FIG. 7, a skilled person in the art will understand that apparatus 700 may include multiple instances of one or more of the components shown in the figure.

While this disclosure has been described in terms of certain embodiments, alterations and permutations of the embodiments will be apparent to those skilled in the art. Accordingly, the above description of example embodiments does not constrain this disclosure. Other changes, substitutions, and alterations are also possible without departing from the spirit and scope of this disclosure. In addition, unless specifically stated otherwise, discussions utilizing terms such as "analyzing," "determining," "enabling," "identifying," "modifying" or the like, refer to the actions and processes of a computer system, or similar electronic computing device, that manipulates and transforms data represented as physical (e.g., electronic) quantities within the computer system's registers and memories into other data represented as physical quantities within the computer system memories or other such information storage, transmission or display devices.

It is to be understood that the above description is intended to be illustrative, and not restrictive. Many other implementations will be apparent to those of skill in the art upon reading and understanding the above description.

What is claimed is:

1. An apparatus, comprising:
a processor configured to:
obtain a sequence of medical scan images associated with a target structure, wherein the sequence of medical scan images includes a first medical scan image and a second medical scan image;
determine, using a first artificial neural network (ANN), a first segmentation of the target structure and a second segmentation of the target structure based on the first medical scan image and the second medical scan image, respectively, wherein the first segmentation indicates a first plurality of pixels of the first medical scan image predicted by the first ANN as belonging to the target structure, and wherein the second segmentation indicates a second plurality of pixels of the second medical scan image predicted by the first ANN as belonging to the target structure;
extract, using a second ANN, a first set of features associated with the first plurality of pixels and a second set of features associated with the second plurality of pixels;
identify a first subset of true positive pixels among the first plurality of pixels and a second subset of true positive pixels among the second plurality of pixels as truly belonging to the target structure, wherein the identification is made based on a determination that a portion of the first set of features that corresponds to the first subset of true positive pixels is substantially similar to a portion of the second set of features that corresponds to the second subset of true positive pixels; and
determine a first refined segmentation of the target structure and a second refined segmentation of the target structure based on the first subset of true positive pixels and the second subset of true positive pixels, respectively.

2. The apparatus of claim 1, wherein the processor is further configured to identify a first subset of false positive pixels and a second subset of false positive pixels from the first plurality of pixels and the second plurality of pixels, respectively, the first subset of false positive pixels comprising pixels from the first medical scan image that have been falsely predicted by the first ANN as belonging to the target structure, the second subset of false positive pixels comprising pixels from the second medical scan image that have been falsely predicted by the first ANN as belonging to the target structure.

3. The apparatus of claim 2, wherein the processor being configured to identify the first subset of false positive pixels and the second subset of false positive pixels comprises the processor being configured to determine that the portion of the first set of features that corresponds to the first subset of true positive pixels is substantially different than a portion of the first set of features that corresponds to the first subset of false positive pixels or a portion of the second set of features that corresponds to the second subset of false positive pixels.

4. The apparatus of claim 3, wherein the second ANN is trained using a contrastive learning technique to minimize a difference between the respective features associated with the first subset of true positive pixels and the second subset of true positive pixels, and to maximize at least one of a difference between the respective features associated with the first subset of true positive pixels and the first subset of false positive pixels, or a difference between the respective features associated with the first subset of true positive pixels and the second subset of false positive pixels.

5. The apparatus of claim 2, wherein the processor being configured to identify the first subset of true positive pixels and the second subset of true positive pixels comprises the processor being configured to:
identify, from the first set of features, one or more features associated with a false positive pixel of the first medical scan image;
identify, from the second set of features, one or more features associated with a pixel of the second medical scan image; and
determine whether the pixel of the second medical scan image belongs to the target structure based on a weighted sum of features calculated from the one or more features identified from the first set of features and the one or more features identified from the second set of features.

6. The apparatus of claim 1, wherein the second ANN is characterized by a recurrent structure via which a first feature extracted by the second ANN from the first medical scan image is used as an input to determine a second feature associated with the second medical scan image.

7. The apparatus of claim 6, wherein the recurrent structure includes one or more encoder modules and one or more decoder modules.

8. The apparatus of claim 6, wherein the second ANN is trained using at least a first training image and a second training image, and wherein, during the training of the second ANN, features extracted from the first training image are used to determine features associated with the second training image and treated as constants during backpropagation.

9. The apparatus of claim 1, wherein the target structure includes a blood vessel, a catheter, or a guide wire, the first medical scan image includes a first x-ray fluoroscopy image, and the second medical scan image includes a second x-ray fluoroscopy image.

10. A method for processing medical scan images, the method comprising:
obtaining a sequence of medical scan images associated with a target structure, wherein the sequence of medical scan images includes a first medical scan image and a second medical scan image;
determining, using a first artificial neural network (ANN), a first segmentation of the target structure and a second segmentation of the target structure based on the first medical scan image and the second medical scan image, respectively, wherein the first segmentation indicates a first plurality of pixels of the first medical scan image predicted by the first ANN as belonging to the target structure, and wherein the second segmentation indicates a second plurality of pixels of the second medical scan image predicted by the first ANN as belonging to the target structure;
extracting, using a second ANN, a first set of features associated with the first plurality of pixels and a second set of features associated with the second plurality of pixels;
identifying a first subset of true positive pixels among the first plurality of pixels and a second subset of true positive pixels among the second plurality of pixels as truly belonging to the target structure, wherein the identification is made based on a determination that a portion of the first set of features that corresponds to the first subset of true positive pixels is substantially similar to a portion of the second set of features that corresponds to the second subset of true positive pixels; and
determining a first refined segmentation of the target structure and a second refined segmentation of the target structure based on the first subset of true positive pixels and the second subset of true positive pixels, respectively.

11. The method of claim 10, further comprising identifying a first subset of false positive pixels and a second subset of false positive pixels from the first plurality of pixels and the second plurality of pixels, respectively, the first subset of false positive pixels comprising pixels from the first medical scan image that have been falsely predicted by the first ANN as belonging to the target structure, the second subset of false positive pixels comprising pixels from the second medical scan image that have been falsely predicted by the first ANN as belonging to the target structure.

12. The method of claim 11, wherein identifying the first subset of false positive pixels and the second subset of false positive pixels comprises determining that the portion of the first set of features that corresponds to the first subset of true positive pixels is substantially different than a portion of the first set of features that corresponds to the first subset of false positive pixels or a portion of the second set of features that corresponds to the second subset of false positive pixels.

13. The method of claim 12, wherein the second ANN is trained using a contrastive learning technique to minimize a difference between the respective features associated with the first subset of true positive pixels and the second subset of true positive pixels, and to maximize at least one of a difference between the respective features associated with the first subset of true positive pixels and the first subset of false positive pixels or a difference between the respective features associated with the first subset of true positive pixels and the second subset of false positive pixels.

14. The method of claim 11, wherein identifying the first subset of true positive pixels and the second subset of true positive pixels comprises:
identifying, from the first set of features, one or more features associated with a false positive pixel of the first medical scan image;
identifying, from the second set of features, one or more features associated with a pixel of the second medical scan image; and
determining whether the pixel of the second medical scan image belongs to the target structure based on a weighted sum of features calculated from the one or more features identified from the first set of features and the one or more features identified from the second set of features.

15. The method of claim 10, wherein the second ANN is characterized by a recurrent structure via which a first feature extracted by the second ANN from the first medical scan image is used as an input to determine a second feature associated with the second medical scan image.

16. The method of claim 15, wherein the recurrent structure includes one or more encoder modules and one or more decoder modules.

17. The method of claim 10, wherein the target structure includes a blood vessel, a catheter, or a guide wire, the first medical scan image includes a first x-ray fluoroscopy image, and the second medical scan image includes a second x-ray fluoroscopy image.

18. A non-transitory computer-readable medium comprising instructions that, when executed by a processor included in a computing device, cause the processor to implement the method of claim 10.

* * * * *